United States Patent [19]

Snodgrass

[11] 3,717,268
[45] Feb. 20, 1973

[54] BOAT TRAILER STRUCTURE
[76] Inventor: Harold F. Snodgrass, 1125 Topeka Street, Emporia, Kans. 66801
[22] Filed: May 10, 1971
[21] Appl. No.: 141,866

[52] U.S. Cl..............................214/83.24, 214/84
[51] Int. Cl. .................................................B60p 3/10
[58] Field of Search ...214/83.24, 505, 506; 280/414; 193/40

[56] References Cited

UNITED STATES PATENTS

| | | | |
|---|---|---|---|
| 3,438,524 | 4/1969 | Snodgrass | 214/505 |
| 3,011,670 | 12/1961 | Chatterton et al. | 214/505 |
| 2,763,384 | 9/1956 | Foster | 214/84 |
| 3,088,569 | 5/1963 | McClelland, Jr. et al. | 193/40 |
| 3,067,892 | 12/1962 | Barrett et al. | 214/506 |
| 3,140,003 | 7/1964 | Horner | 214/505 |

Primary Examiner—Albert J. Makay
Attorney—Fishburn, Gold & Litman

[57] ABSTRACT

A boat trailer structure including an elongated track mounted on and extending longitudinally along a longitudinal central axis of a mobile frame and having a first portion for movement of a lead boat supporting dolly and a second portion for movement of a plurality of boat supporting carriages spaced from the lead dolly. An entrance guide roller is mounted on the frame and positioned to be engaged by a bow of a boat to guide same onto spaced support rollers positioned adjacent the guide roller to engage and support bottom surfaces of a boat on the boat trailer structure.

10 Claims, 12 Drawing Figures

BOAT TRAILER STRUCTURE

The present invention relates to boat trailer structures and more particularly to a boat trailer structure having a plurality of boat supporting carriages engageable with a keel of a boat and movable longitudinally of the boat trailer structure to support a boat during loading an unloading.

Many boat trailer structures have been provided for transporting boats from a place of storage to a body of water and return to storage, however, conventional boat trailer structures do not provide means for centering the boat on the trailer and supporting the boat thereon to minimize stresses in the hull. Loading of boats on conventional or prior art boat trailer structures is particularly difficult during high wind and high wave action.

The principal objects of the present invention are: to provide a boat trailer structure eliminating the above mentioned difficulties and providing easy loading of a boat thereon and easy centering of the boat on the trailer structure particularly during high wind and high wave action; to provide such a boat trailer structure particularly adapted to provide support for a boat thereon and effecting minimum stresses in a boat while in a loaded position; to provide such a boat trailer structure adapted to maintain a boat securely positioned thereon; to provide such a boat trailer structure having a novel winch adjacent a forward end thereof to permit a boat to be loaded onto and unloaded from the trailer without getting onto the trailer or into the water; to provide such a boat trailer structure requiring a minimum effort or minimum boat power to load a boat onto the trailer; to provide such a boat trailer structure having component parts thereof positioned whereby wind and wave actions have a minimum effect on loading of a boat onto the trailer; to provide such a boat trailer structure having an entrance guide roller and adjustable support rollers adjacent a rear end thereof to receive and accurately position a boat during loading thereof on the trailer; and to provide such a boat trailer structure which is positive in operation, sturdy in construction, durable in use, inexpensive to manufacture, and particularly well adapted for the proposed use.

Other objects and advantages of this invention will become apparent from the following description taken in connection with the accompanying drawings wherein are set forth by way of illustration and example certain embodiments of this invention.

The drawings constitute a part of this specification and include exemplary embodiments illustrating various objects and features of the boat trailer structure of the present invention.

Referring more in detail to the drawings:

As required, detailed embodiments of the present invention are disclosed herein, however, it is to be understood that the disclosed embodiments are merely exemplary of the invention which may be embodied in various forms that are different from those illustrative embodiments presented herein, therefore, specific structural and functional details disclosed herein are not to be interpreted as limiting but merely as a basis for the claims actually defining the scope of this invention. In this regard, it is to be recognized that boat trailer structures in accordance herewith may be embodied in various forms and, furthermore, that such boat trailer structures may be variously supported and removably coupled to a towing vehicle. However, the disclosure hereof is presented only as a representative basis for teaching one skilled in the art to variously employ the present invention in virtually any appropriate detailed structure.

In the disclosed embodiment of the present invention, the reference numeral 1 generally designates a boat trailer structure having an elongated track 2 mounted on and extending longitudinally along a longitudinal central axis of an elongated mobile frame 3 for movement of a lead boat supporting dolly 4 between opposite ends of the mobile frame 3 while supporting a boat 5 adjacent a bow 6 thereof. A guide roller 7 is mounted on the frame 3 and positioned to be engaged by the bow 6 of the boat 5 to guide same onto spaced support rollers 8 and 9 positioned on respective opposite sides of the guide roller 7 to engage and support bottom surfaces of the boat 5 on the boat trailer structure 1.

The mobile frame 3 may be any suitable wheel based frame having a draft tongue 10 coupled thereon and extending outwardly therefrom and having suitable means (not shown) thereon for removably coupling the mobile frame 3 to a towing vehicle (not shown). The illustrated mobile frame 3 has a rectangular rear portion defined by transversely spaced elongated side rails 11 and 12 with a plurality of longitudinally spaced and transversely extending stiffening or bracing members 13 each having respective opposite ends thereof suitably secured to the side rails 11 and 12. The mobile frame 3 has a generally triangular forward end portion 14 having the draft tongue 10 secured thereto and extending outwardly or forwardly therefrom.

A rear end portion 15 of the mobile frame 3 has end members 16 and 17 mounted on and extending rearwardly of the side rails 11 and 12 respectively to form a V-shaped recess 18 for guiding and initially centering the boat 5 onto the boat trailer structure 1 as the boat approaches the boat trailer structure 1 from the water. Exposed surfaces of the end members 16 and 17, particularly the surfaces adjacent the V-shaped recess 18 may have suitable pads of resilient material thereon to substantially avoid or reduce damage to the finish of the respective boat surfaces engaging the end members 16 and 17.

In the illustrated structure, the end members 16 and 17 each have a forward portion 19 thereof suitably supported on the side rails 11 and 12 respectively, as by a plurality of longitudinally spaced U-bolts 20 each having a clamping plate 21 secured in position, as by a plurality of nuts 22 on opposite ends of the U-bolts 20. The end members 16 and 17 have tie or stiffening portions 23 and 24 respectively extending from portions thereof defining the V-shaped recess 18 and generally parallel with an end bracing or stiffening member 13 at the rear end portion 15 of the frame 3 and suitably secured to the forwardly extending portion 19 of the respective end members 16 and 17, as by welding.

The track 2 may be constructed in any suitable manner and positioned or disposed along a longitudinal central axis of the mobile frame 3 for supporting the lead dolly 4 for movement between opposite ends of the mobile frame 3. The illustrated track 2 comprises a pair of transversely spaced rails 25 and 26 centered on the longitudinal central axis of the mobile frame 3 and preferably formed of suitable laterally spaced structural members, such as beams, channels, angles, and the like, having suitable flanges or legs extending transversely outwardly to provide support for suitable wheels 27 and 28 at respective opposite sides of the dolly 4.

It is desirable to provide limits for movement of the dolly 4 along the track rails 25 and 26, therefore, keeper pins 29 and 30 are positioned adjacent a rear end of the track 2 and adjacent the entrance or guide roller 7 for holding the dolly 4 in a storage position, as later described, to be engaged by a bow 6 of the boat 5 after moving over the guide or entrance roller 7 and a forward abutment member 31 extends transversely between the track rails 25 and 26 adjacent forward ends thereof and the abutment member 31 has respective opposite ends suitably secured to the rails 25 and 26, as by welding or bolts, thereby defining limits for the travel of the dolly 4 along the track 2.

Particularly for longer boats, it is desirable to provide support for intermediate portions of a keel 32 of the boat 5 between the dolly 4 and the entrance or guide roller 7, therefore, the track 2 has a second portion 33 for movement of a plurality of boat supporting carriages 34 spaced from the lead dolly 4 and a storage portion longitudinally aligned with the second portion 33 of the track 2 and positioned below same and communicating therewith for storage of the carriage 34 when not engaging and supporting a boat 5.

The second portion 31 of the track 2 is illustrated as a pair of transversely inwardly extending flanges 36 and 37 positioned in facing relation and extending longitudinally along facing surfaces of the track rails 25 and 26 and suitably secured thereto, as by being integrally formed therewith or by welding, to support suitable wheels 38 and 39 respectively of the carriages 34, as later described, thereby defining the second portion 33 of the track 2.

The storage portion 35 and the second portion 33 of the track 2 are longitudinally aligned along the longitudinal central axis of the mobile frame 3 and the storage portion 35 comprises a pair of transversely spaced rails 40 and 41 positioned between and below the rails 25 and 26 of the dolly supporting portion of the track 2, to thereby support the wheels 38 and 39 of the carriages 34 when same are in a storage position. Forward portions 42 and 43 of the rails 40 and 41 respectively defining the storage portion 35 of the track 2 are connected to the flanges 36 and 37 defining the second portion 33 of the track 2 and are disposed in a curved path extending upwardly from the rails 40 and 41 defining the storage portion 35 to provide continuous support between the storage portion 35 and the second portion 33 for movement of the carriages 34 between a storage position and an in-use position.

Boat engaging and supporting means are disposed adjacent a rear end of the mobile frame 3 and centered on the longitudinal central axis of the frame 3 for receiving the bow 6 of a boat 5 for guiding the boat 5 onto the boat trailer structure 1. In the illustrated structure, the boat engaging and supporting means includes the guide or entrance roller 7 rotatably mounted adjacent the rear end portion 15 of the mobile frame 3 and centered on and extending transversely of the longitudinal central axis of the frame. The entrance or guide roller 7 is aligned with the V-shaped recess 18 and is positioned between the end bracing or stiffening member 13 and the tie or stiffening portions 23 and 24 of the end members 16 and 17. The guide or entrance roller 7 has a shaft extending therethrough which has respective opposite ends thereof rotatably mounted in suitable bushings or bearings 44 supported on suitable brackets 45 and 46 supported on the rearward extensions of the track rails 25 and 26 respectively.

The boat engaging and supporting means also includes the support rollers 8 and 9 adjacent respective opposite ends of the guide or entrance roller 7 and rotatably mounted on the mobile frame 3 and positioned to engage bottom surfaces of a boat 5 on opposite sides of a keel 32 or a longitudinal central axis thereof. In the illustrated structure, the support rollers 8 and 9 are each adjustable to conform to a contour of the bottom surfaces of a boat 5 and the support rollers 8 and 9 each include a pair of spaced rollers, more particularly an interior roller 47 and an exterior roller 48 rotatably mounted on a suitable shaft which is adjustable vertically relative to the guide or entrance roller 7.

The illustrated adjustable mounting of the support rollers 8 and 9 includes a pair of threaded shafts 49 and 50 each having an upper end thereof with the roller support shaft extending therethrough and supporting the interior and exterior rollers 47 and 48 and intermediate portions of the threaded shafts 49 and 50 extend through suitable apertures in ears 51 and 52 respectively extending outwardly from respective tie or stiffening portions 23 and 24 of the end members 16 and 17. Suitable nuts 53 and 54 are mounted on the threaded shafts 49 and 50 and positioned on opposite sides of the respective ears 51 and 52 whereby adjustment of the nuts 53 and 54 is operative to vertically adjust the interior and exterior rollers 47 and 48 relative to the guide or entrance roller 7 and to a position to conform to a contour of the bottom surfaces of a boat 5 to be supported thereon.

The boat engaging and supporting means also includes means mounted on opposite sides of the mobile frame 3 and adjacent the rear end portion 15 thereof for engaging opposite sides of a boat 5 and guiding same for longitudinal movement along the frame 3. In the illustrated embodiment, adjustable boat guides 55 and 56 are positioned at the end of either side of the frame 3 and the boat guides 55 and 56 each have a roller 57 mounted on an arm 58 pivotally coupled to a mounting member 59, as at 60, to thereby provide complete mobility for the arm to be adjusted so that angle from the roller 57 to the frame 3 coincides with the angle of the side of a boat 5. The boat guides 55 and 56 are each adjusted so that the entire length of the rollers 57 contact the boat as the boat passes over the rear portions of the boat trailer structure 1.

The V-shaped recess 18, support rollers 8 and 9, guide or entrance roller 7, and the boat guides 55 and 56 cooperate to center or align the keel 32 of a boat 5 with the longitudinal central axis of the boat trailer structure 1 for movement of the bow 6 onto the dolly 4 and into engagement with a suitable keel pad 61 mounted on a dolly frame 62 movably supported on the rails 25 and 26 of the track 2 and extending transversely thereof and having spaced opposite end portions 63 and 64 depending from the dolly frame 62 and substantially centered on the longitudinal central axis of the movable frame 3. The end portions 63 and 64 of the dolly frame 62 rotatably support the wheels 27 and 28 respectively for movement along the track rails 25 and 26. The dolly frame 62 has suitable support pads 65 and 66 mounted thereon and positioned on opposite sides of the keel pad 61 for supporting respective bottom surfaces of a boat adjacent a keel 32 thereof.

Latch means are provided adjacent the rear end portion 15 of the frame 3 and on the dolly 4 to releaseably position the dolly 4 in a storage position wherein engagement between the dolly 4 and the keeper pins 29 and 30 is provided by arms 67 and 68 pivotally mounted on the opposite end portions 63 and 64 respectively of the dolly frame 62. A rear end of each of the arms 67 and 68 has a notch or recess therein engageable with the pins 29 and 30 respectively and suitable resilient means, such as springs 69 and 70, urge the rear ends of the arms 67 and 68 into engagement with the keeper pins 29 and 30 respectively thereby releaseably positioning the dolly 4 in a storage position adjacent the boat engaging and supporting means and more particularly adjacent the guide or entrance roller 7.

Release of the arms 67 and 68 from the keeper pins 29 and 30 is effected by engagement of the bow 6 of a boat 5 with a release bar of frame 71 operative to effect release of the dolly 4 from the storage position in response to movement of the boat 5 onto the boat trailer structure 1. The release bar or frame 71 is illustrated as a substantially U-shaped frame having a bow engaging member 72 extending substantially transverse to the longitudinal central axis of the boat trailer structure 1 and having respective opposite ends thereof connected to one end of the respective side arms 73 and 74 which each have the other end thereof pivotally connected to an other end of the arms 67 and 68 on the dolly 4. The side arms 73 and 74 are moved toward the forward or front end of the boat trailer structure 1 in response to engagement of the bow 6 with the bow engaging member 72 as the boat 5 is moved onto the boat trailer structure 1 thereby disengaging the rear ends of the arms 67 and 68 from the keeper pins 29 and 30 respectively to thereby permit the dolly 4 to move forwardly along the rails 25 and 26 of the track 2 while supporting the bow 6.

Movement of the dolly 4 along the track 2 is operative to effect movement of the carriages 34 from the storage portion 35 of the track 2 and into the second portion 33 thereof and to space the carriages 34 therealong. In the illustrated embodiment, a catch bar 75 is positioned on the dolly frame 62 and extends between the end portions 63 and 64 to engage a guide member 76, as later described.

The boat supporting carriages 34 are each illustrated as including a carriage frame 77 movably supported on the storage portion 35 and the second portion 33 of the track 2 and movable therealong and therebetween. Each carriage frame 77 has spaced opposite end portions thereof substantially centered on the longitudinal central axis of the mobile frame 3 and depending from the carriage frame 77 for rotatably supporting the wheels 38 and 39 respectively on suitable respective axles mounted thereon. Each carriage frame 77 has means thereon for supporting a keel 32 and adjacent bottom surfaces of a boat 5 and in the illustrated structure, a keel pad 78 is mounted on upper ends of transversely spaced shafts 79 and 80 having lower ends thereof supported on the carriage frame 77, as in suitable nuts 81 secured thereon. The keel pad 78 may be adjusted vertically by rotating the shafts 79 and 80 to extend or retract same relative to the carriage frame 77 to thereby conform to the shape of the respective keel 32 and adjacent bottom surfaces of a boat 5 being supported on the boat trailer structure 1.

Means are provided for connecting the carriages 34 and effecting movement thereof from the storage portion 35 of the track 2 and along the second portion of the track 2 and spacing same therealong in response to movement of the dolly 4. The carriage connection means is illustrated as including the guide member 76 which is movable along a center track 82 and has an upstanding portion 83 engageable by the catch bar 75 of the dolly 4. Suitable flexible member portions, as later described, extend between the upstanding portion 83 of the guide member 76 and one of the carriages 34 and between each of the carriages 34 to thereby move the guide member 76 and the carriages 34 in spaced relation behind the dolly 4 as same is moved along the track 2 by movement of a boat 5 onto and along the boat trailer structure 1. The flexible member portions each have a selected length to thereby maintain a selected spacing between the dolly 4 and the carriages 34 and between respective carriages. The flexible member portions are illustrated as chains 84.

When the carriages 34 are in the storage portion 35 of the track 2, the chains 84 therebetween will depend or hang downwardly therefrom and could drag or become tangled or collect brush or debris when the boat trailer structure 1 is moved over other than paved surfaces, therefore, it is desirable to provide means, as later described, between adjacent carriages 34 having respective portions of the chains 84 connected thereto for supporting the chain portions 84 and for reducing an amount of the chain depending from the carriages 34 when in the storage portion 8 of the track 2.

It is also desirable to substantially maintain the carriages 34 aligned with the longitudinal central axis of the mobile frame 3, therefore, chain support members 85 are positioned between adjacent carriages 34 and have suitable wheels 86 and 87 rotatably mounted on opposite ends thereof for travel along the rails 40 and 41 and forward portions 42 and 43 and flanges 36 and 37 respectively. A suitable generally triangular-shaped clevis 88 has opposite ends thereof mounted in suitable apertures adjacent opposite ends of the chain support members 85 and on each side thereof to permit free pivotal movement of the respective clevis 88. A center portion of each clevis 88 has an end of a chain portion 84 connected thereto. The generally triangular shape of each clevis 88 is effective to maintain the respective chain support member 85 substantially centered on the longitudinal central axis of the mobile frame 3 and thereby maintain the respective chain portions 84 aligned with the longitudinal central axis to maintain the carriages 34 aligned with said axis for substantially free movement along the second portion 33 and storage portion 35 of the track 2.

It is desirable to provide means engageable with a stern or transom 89 of a boat 5 for retaining the boat 5 on the boat trailer structure 1. It is also desirable that the stern engaging means have movable portions to selectively permit the boat to be loaded and unloaded, as by having the movable portions movable between a retracted position and an extended position. In the illustrated embodiment, a stern catch 90 is mounted adjacent the rear end portion 15 of the mobile frame 3 and includes a generally vertically extending support member 91 mounted adjacent the rear end portion 15 of the mobile frame 3, as by being mounted on one of the tie or stiffening portions 23 and 24 of the end members 16 and 17 respectively.

The support member 91 is illustrated as a generally vertically extending member having a guide frame 92 mounted thereon. The movable portions of the stern catch 90 are illustrated as a plunger shaft 93 resiliently mounted within the guide frame 92, as by having a plurality of springs 94 in engagement with the guide frame 92 and respective shoulders on the plunger shaft 93 to thereby urge same to an extended position. A keeper roller 95 is rotatably mounted on an upper end of the plunger shaft 93 and is engageable with a bottom surface of a boat 5 during loading and unloading thereof whereby the weight of the boat depresses the plunger shaft 93 and the springs 94 to position same in a retracted position.

After a boat 5 has been unloaded from the boat trailer structure 1 and after a boat has been loaded onto the boat trailer structure 1, the springs 94 urge the plunger shaft 93 and the keeper roller 95 thereon upwardly into the extended position to engage the transom or stern 89 of the boat to prevent same from moving rearwardly and off the boat trailer structure 1 and returning to the water. It is desirable to provide means to selectively move the plunger shaft 93 to a retracted position to permit unloading of the boat, therefore, an L-shaped member 96 has an intermediate portion thereof pivotally mounted adjacent a lower end of the generally vertically extending support member 91 and one arm 97 of the L-shaped member 96 is pivotally connected to a lower end of the plunger shaft 93 whereby movement of an other arm 98 of the L-shaped member 96 is effective to move the plunger shaft 93 relative to the guide frame 92. In the illustrated embodiment, a suitable flexible member 99, such as rope, cable or the like, is suitably attached to a lower end of the other arm 98 and extends under the boat trailer structure 1 to a point adjacent the forward end portion 14 thereof, as later described.

It is desirable to prevent vertical movement of the boat 5 on the boat trailer structure 1, particularly vertical bouncing and separation of the boat 5 from the dolly 4 and carriages 34, therefore, hold downs 100 and 101 have one end thereof secured to the end members 16 and 17 respectively and suitable boat engaging members 102 and 103 are pivotally mounted on the respective other end thereof for engaging an upper edge of the transom or stern 89. It is also desirable to provide a resilient portion in each of the hold downs 100 and 101, therefore, suitable springs 104 and 105 respectively are provided to maintain the boat 5 in contact with the boat trailer structure 1 and to accommodate various size boats.

It is desirable to provide means adjacent the forward end portion 14 of the mobile frame 3 for attachment of the flexible member 99 and for limiting forward and transverse movement of a bow 6 of the boat 5, therefore, a standard 106 is secured to and extends upwardly from a point adjacent the forward end portion 14 of the mobile frame 3, as for example on the draft tongue 10, and has means, as later described, mounted adjacent an upper end of the standard 106 and engageable by a bow 6 of the boat 5 to limit forward and transverse movement thereof. In the illustrated structure, the bow or prow engaging means have an intermediate portion 107 secured to the standard 106 and arms 108 and 109 extending generally outwardly therefrom to form a V- or U-shaped recess to be engaged by opposite sides of the boat 5 adjacent the bow 6. Facing surfaces of the arms 108 and 109 may have suitable pads of resilient material mounted thereon to substantially avoid or reduce damage to the finish of the respective boat surfaces.

A winch structure 110 is provided for moving a boat 5 from a body of water and onto the boat engaging and supporting means including the guide or entrance roller 7 and the support rollers 8 and 9 and onto the dolly 4 and onto a plurality of the carriages 34 for moving the boat 5 toward a forward end of the boat trailer structure 1 and for unloading the boat 5 therefrom and return to the respective body of water. In the illustrated structure, a generally U-shaped frame 111 is mounted adjacent an upper end of the standard 106 for rotatably supporting a drum 112, as on a suitable axle or shaft 113 having opposite ends thereof suitably supported on spaced flanges 114 and 115 of the U-shaped frame 111. The drum 112 has end flanges 116 and 117 mounted thereon and spaced inwardly from the flanges 114 and 115 respectively of the U-shaped frame 111.

The winch structure 110 is provided with means for selectively effecting rotation of the drum 112 and in the illustrated structure, one of the end flanges of the drum, for example, end flange 116 has a gear 118 mounted thereon and which is in engagement with a driving gear 119 mounted on a rotatable shaft 120 which is turned by a suitable handle or crank 121 to thereby effect rotation of the drum 112. A dog or pawl 122 is mounted on a shaft 123 extending between the flanges 114 and 115 of the U-shaped frame 111 and has a keeper portion engageable with the driving gear 119 for preventing reverse rotation of the drum 112.

The other end flange 117 of the drum 112 has a slot 124 extending from a peripheral edge thereof to adjacent a drum surface for receiving one end portion of a flexible member, such as a winch rope, windable around the drum 112 and having an other end portion thereof attached to the boat 5 adjacent the bow 6 thereof, as by being secured to a suitable bow eye 125.

For launching a boat 5 from the boat trailer structure 1, the hold downs 100 and 101 are released from the stern or transom 89 and the boat trailer structure 1 is then backed into the water to a position having an upper surface of the body of water in engagement with the guide or entrance roller 7. A winch rope having one end suitably connected to the bow eye 125 of the boat 5 is removed from the winch structure 110 and an extra length of rope (not shown) is connected to the winch rope adjacent an end knot therein or end portion thereof, as by a suitable snap. The stern catch 90 is then released by pulling on the flexible member 99. The boat 5 then moves by its own weight into the water while the ropes attached thereto are employed to control the rate of movement into the water and to guide the boat 5 onto a ramp or a bank for boarding. The extra section of rope is disconnected from the winch rope which is attached to the boat and may be stored on the boat trailer structure 1 or in the boat 5 to assist in reloading on the boat trailer structure 1. It is preferred that the winch rope have a knot or end portion at one end thereof and the other end attached to the boat and be a length only slightly longer than the length of the boat trailer structure 1, or in other words, the distance between the bow eye 125 and the winch structure 110 when the boat 5 has the bow 6 thereof positioned within the V-shaped recess 18 at the rear of the boat trailer structure 1.

Loading of a boat 5 onto the boat trailer structure 1 is accomplished by positioning the boat trailer structure 1 in the water at a depth similar to the launching depth or slightly deeper, for example, having the guide or entrance roller 7 submerged just below the upper surface of the respective body of water. The boat 5 is maneuvered into a position having the bow 6 thereof within the V-shaped recess 18 and is moved into engagement with the guide or entrance roller 7 and the support rollers 8 and 9. The keel 32 of the boat 5 engages the entrance roller 7 and the boat motor may be operated to move the boat 5 forwardly of the boat trailer structure 1. The bow 6 engages the keel pad 61 of the dolly 4 and engages the release bar or frame 71 to move same forwardly to thereby disengage the side arms 73 and 74 from the keeper pins 29 and 30 thereby effecting forward movement of the dolly 4 whereby the catch bar 75 engages the guide member 76 and moves same forwardly therewith thereby moving the carriages 34 from the storage portion 35 of the track 2 and into the second portion 33 thereof. When the boat is in position on the boat trailer structure 1, the stern catch 90 engages the stern or transom 89 to prevent the boat from re-entering the water. The winch rope is then suitably attached to the winch structure 110. When it is desired to winch the boat onto the boat trailer structure 1, the extra length of rope is attached to the winch rope and the boat is driven onto a bank or ramp and a person therein moves onto the bank and takes the winch rope and additional or extra length of rope and pushes the boat 5 into the water and maneuvers the bow 6 thereof into the V-shaped recess 18. The winch rope is then mounted on the winch structure 110 by placing a knot in the end thereof in the slot 124 and the handle 121 is turned to move the boat longitudinally forwardly of the boat trailer structure 1.

Figure 1:
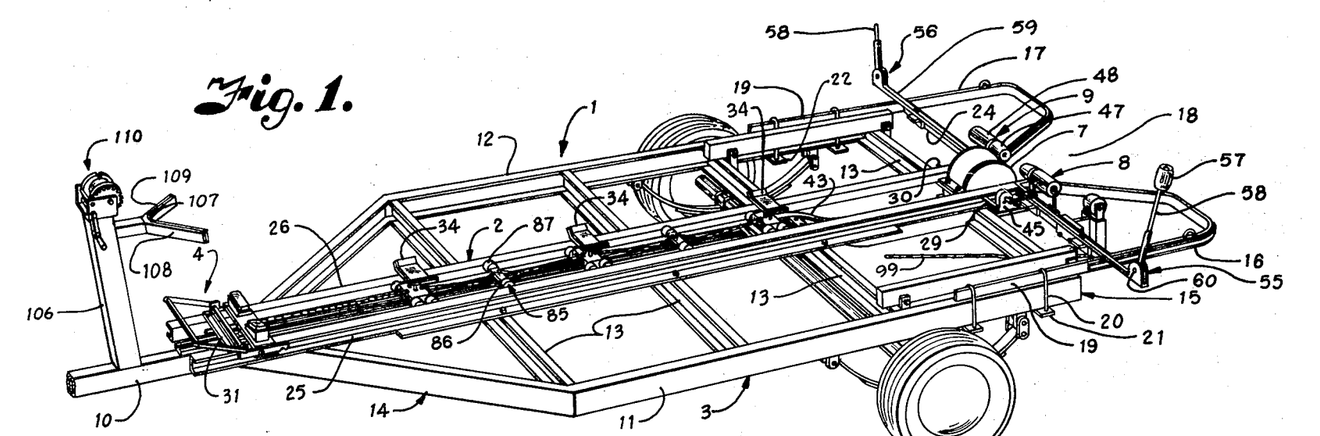
FIG. 1 is a perspective view of a boat trailer structure embodying features of the present invention and having the component parts thereof shown in position for supporting a boat (not shown).
Figure 2:
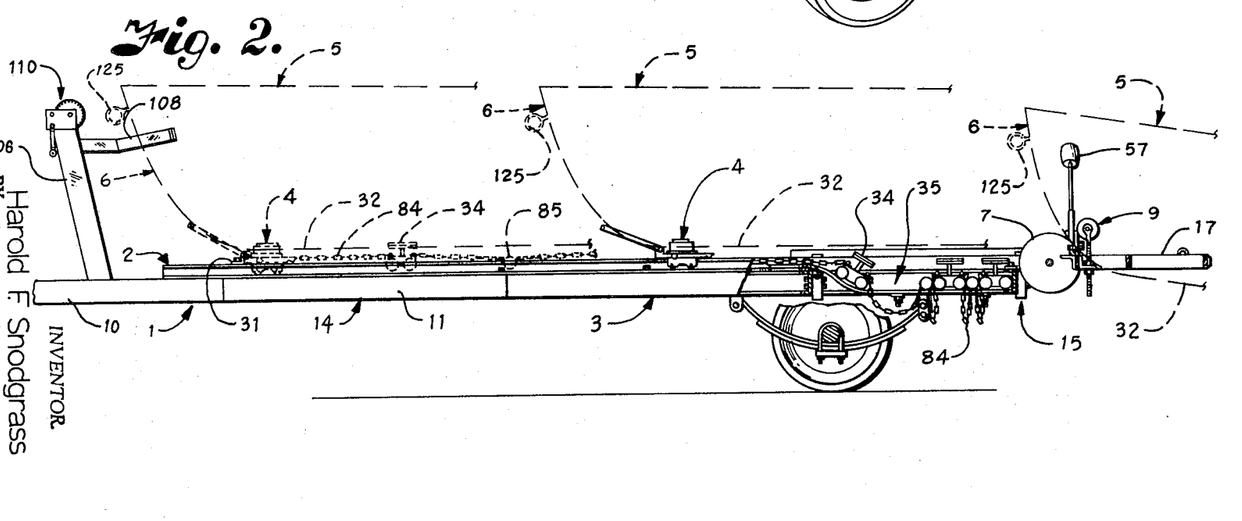
FIG. 2 is a side elevational view of the boat trailer structure with portions broken away to better illustrate the component parts and showing progressive loading positions of a boat and boat supporting elements in broken lines.
Figures 3, 4, 5:
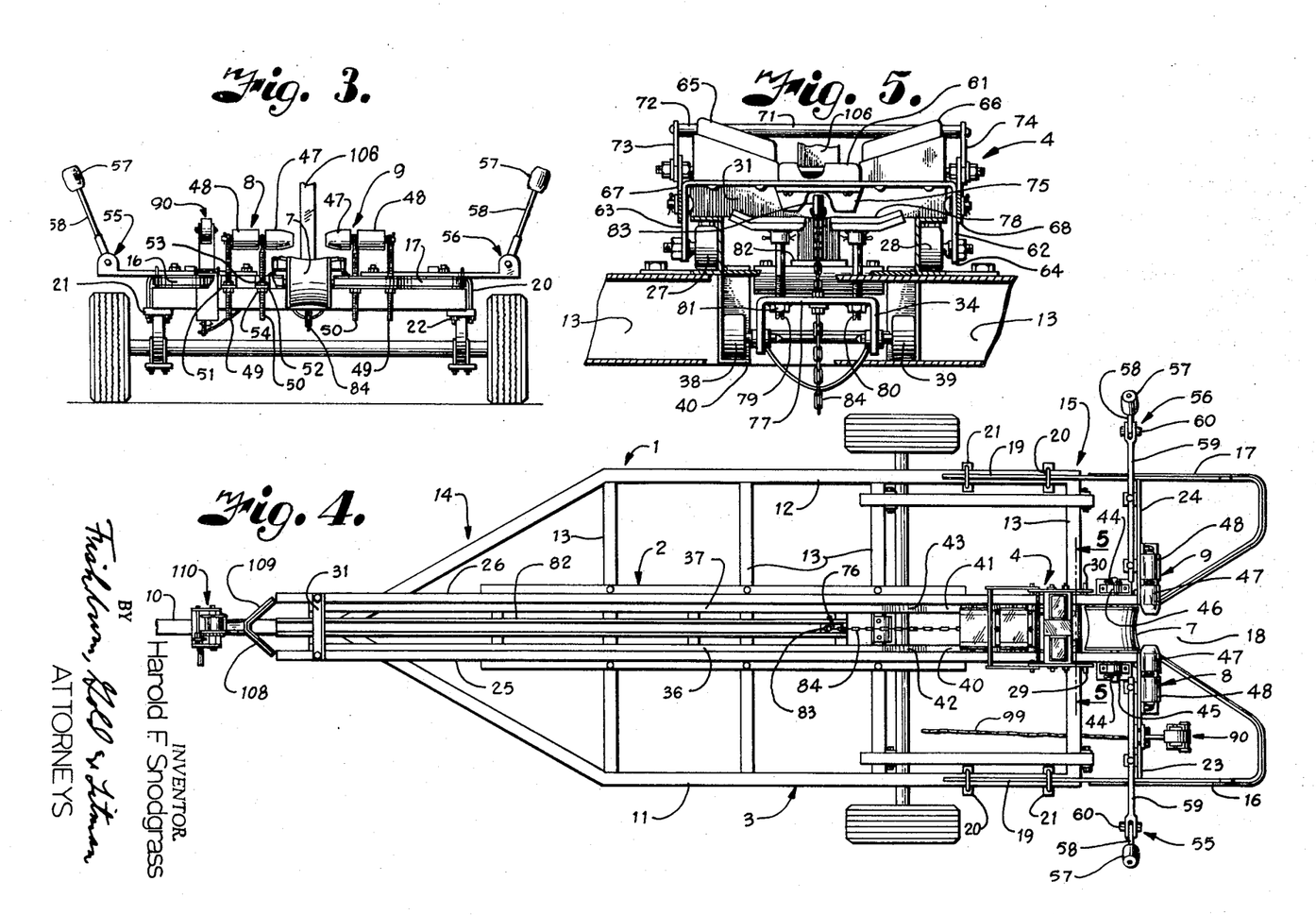
FIG. 3 is a rear end elevational view of the boat trailer structure.
FIG. 4 is a plan view of the boat trailer structure.
FIG. 5 is an enlarged fragmentary transverse sectional view taken on line 5—5, FIG. 4 and showing a movable boat supporting dolly and boat supporting carriages and members for supporting the dolly and carriages for longitudinal movement of the boat trailer structure.
Figures 6, 7, 8, 9:
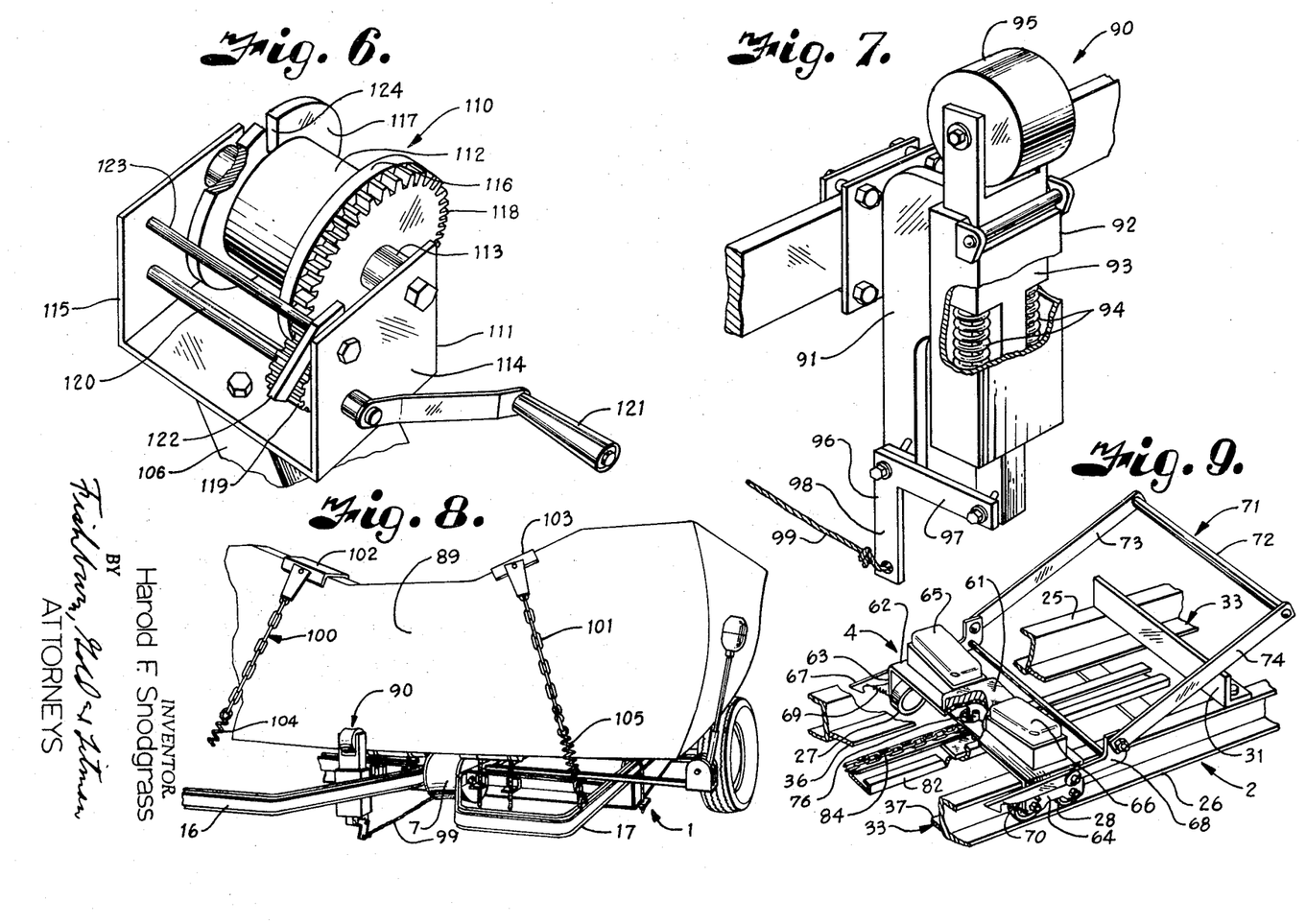
FIG. 6 is an enlarged fragmentary perspective view of a winch structure for moving a boat longitudinally along the boat trailer structure.
FIG. 7 is an enlarged fragmentary perspective view of a boat retaining device for engaging a stern of a boat.
FIG. 8 is a fragmentary perspective view of a rear end of a boat trailer structure and showing a stern of a boat maintained in position by the boat retaining device and boat guides and hold down members.
FIG. 9 is an enlarged fragmentary perspective view of the boat supporting dolly shown adjacent a forward end of the boat trailer structure.
Figures 10, 11, 12:
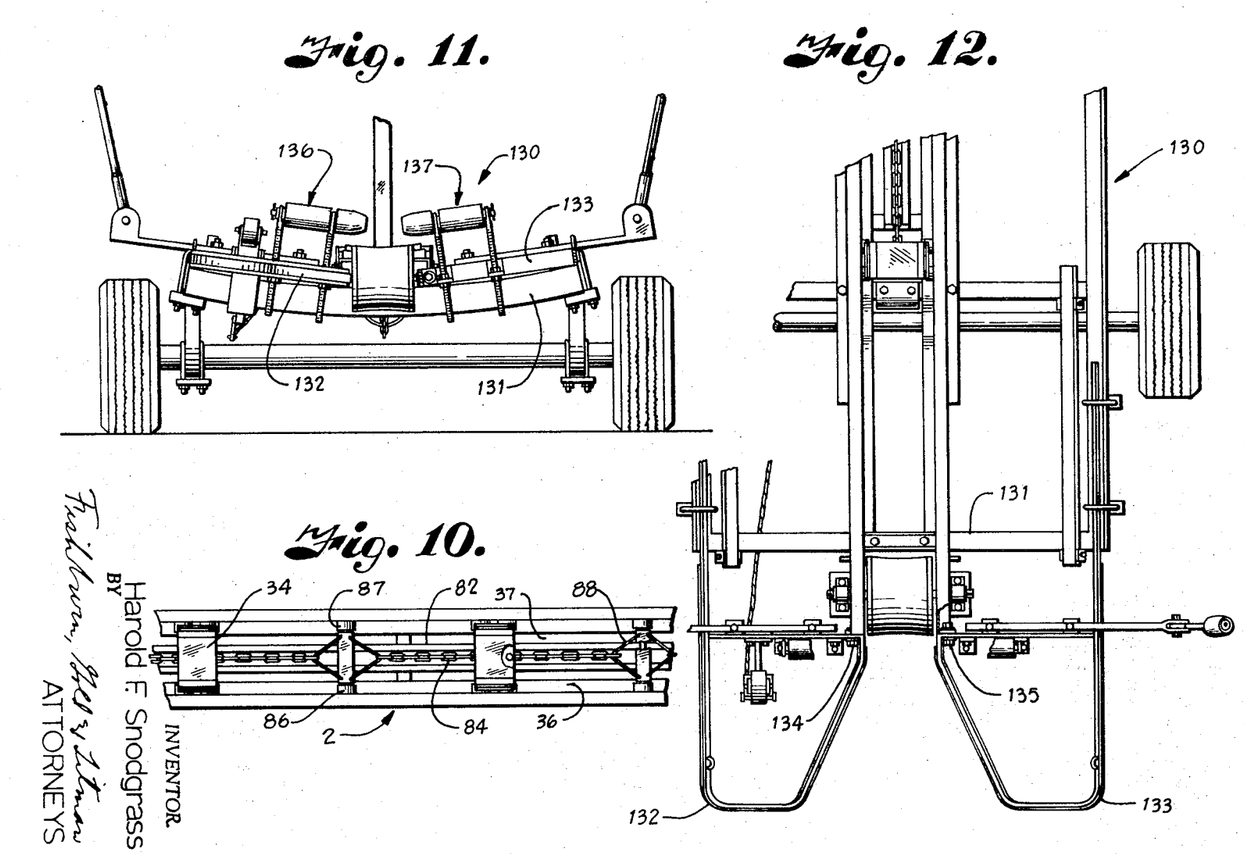
FIG. 10 is a fragmentary plan view of a track for movement of a plurality of boat supporting guides longitudinally of the boat trailer structure.
FIG. 11 is a rear end elevational view of a modified boat trailer structure for boats having V, trihedral, or conventional hulls.
FIG. 12 is a fragmentary plan view of the modified boat trailer structure.

FIGS. 11 and 12 illustrate a modified boat trailer structure 130 wherein bracing or stiffening members 131 are generally arcuate and have a concave upper surface to provide support for boats having V, trihedral, or conventional hulls. Spaced end members 132 and 133 having portions defining a V-shaped recess 134 have the interior ends thereof pivotally mounted, as at 135 and 136 respectively, to thereby adjust the position of support rollers 137 and 138. Remaining components of the modified boat trailer structure 130 are substantially the equivalent of those illustrated in FIGS. 1 to 10 inclusive. Loading and unloading of boats is performed in substantially a similar manner as for loading and unloading the boat 5 onto and from the boat trailer structure 1.

It is to be understood that while I have illustrated and described certain forms of my invention, it is not to be limited to these specific forms or arrangement of parts herein described and shown.

What I claim and desire to secure by Letters Patent is:

1. A boat trailer structure comprising:
  a. an elongated mobile frame having a front end and a rear end and having means thereon for removably coupling said frame to a vehicle;
  b. track means disposed along a longitudinal central axis of said mobile frame;
  c. boat engaging and supporting means disposed adjacent the rear end of said mobile frame and centered on the longitudinal central axis of said frame;
  d. a movable boat supporting dolly engaging said track means and movable between said boat engaging and supporting means and a forward portion of said track means;
  e. means adjacent the rear end of said mobile frame and on said dolly for releaseably positioning said dolly adjacent said boat engaging and supporting means and for releasing said dolly for movement along said track means in response to movement of a boat onto said dolly;

f. said boat supporting dolly includes a dolly frame movably supported on said track means and extending transversely thereof and having spaced opposite ends thereof substantially centered on the longitudinal central axis of said mobile frame and means on said dolly frame for supporting a keel and adjacent bottom surfaces of a boat; and g. said means for releaseably positioning said dolly and for releasing said dolly in response to engagement of a boat with said dolly includes an arm pivotally mounted on said dolly frame and latch means on said arm for releaseably engaging keeper members adjacent a rear end of said track means and means on said arm and engageable by a bow of a boat to effect release of said arm from the keeper members to thereby release said dolly.

2. A boat trailer structure as set forth in claim 1 wherein said boat engaging and supporting means includes:

a. a guide roller rotatably mounted adjacent the rear end of said frame and centered on and extending transversely of said longitudinal central axis of said frame;

b. support roller means rotatably mounted on said frame and positioned adjacent said guide roller to engage bottom surfaces of a boat on opposite sides of a longitudinal central axis of a boat; and c. means engaging said support roller means for adjusting same to conform to a contour of the bottom surfaces of the boat, said guide roller and support roller cooperating with said dolly in holding a boat centered as the boat moves onto the trailer structure in loading.

3. A boat trailer structure comprising:

a. an elongated mobile frame having a front end and a rear end and having means thereon for removably coupling said frame to a vehicle;

b. track means disposed along a longitudinal central axis of said mobile frame and having forward and rear ends thereof adjacent front and rear ends of said mobile frame;

c. boating engaging and supporting means disposed adjacent the rear end of said mobile frame and centered on the longitudinal central axis of said frame;

d. a movable boat supporting dolly engaging said track means and movable between said boat engaging and supporting means and a forward portion of said track means;

e. means adjacent the rear end of said mobile frame and on said dolly for releaseably positioning said dolly adjacent said boat engaging and supporting means and for releasing said dolly for movement along said track means in response to movement of a boat onto said dolly;

f. said boat supporting dolly includes a dolly frame movably supported on said track means and having spaced opposite ends thereof substantially centered on the longitudinal central axis of said mobile frame and means on said dolly frame for supporting a keel and adjacent bottom surfaces of a boat;

g. said means for releaseably positioning said dolly and for releasing said dolly in response to engagement of a boat with said dolly includes an arm pivotally mounted on said dolly frame and latch means on said arm for releaseably engaging keeper means adjacent a rear end of said track means and means associated with said arm and engageable by a bow of a boat to effect release of said arm from the keeper members to thereby release said dolly;

h. means operatively engageable by said boat supporting dolly and movably along said track means for engaging and supporting intermediate portions of a keel of a boat between said dolly and said boat engaging and supporting means.

4. A boat trailer structure as set forth in claim 3 wherein said means for engaging and supporting intermediate portions of a keel of a boat includes:

a. storage track means communicating with said first named track means;

b. a plurality of boat supporting carriages movable from said storage track means and into and along said first named track means; and c. means connecting said carriages and engageable by said dolly for effecting movement of said carriages from said storage track means into said first named track means and spacing same therealong.

5. A boat trailer structure as set forth in claim 3 and including:

a. a standard extending upwardly from adjacent forward end of said frame;

b. a drum having spaced end flanges and means adjacent an upper end of said standard for rotatably supporting the drum;

c. means on said drum supporting means and on one of said end flanges for selectively effecting rotation of said drum;

d. a flexible elongate line connected from the bow of a boat to be loaded on said trailer, said line having a free end remote from said bow;

e. a slot in the other of said end flanges for removably receiving said free ends of said flexible line and holding same as said flexible line is wound around said drum to draw the boat onto the trailer.

6. A boat trailer structure comprising:

a. an elongated mobile frame having a front end and a rear end and a draft tongue coupled to the front end thereof and extending outwardly therefrom and having means thereon for removably coupling said frame to a vehicle;

b. track means disposed along a longitudinal central axis of said mobile frame;

c. storage track means communicating with said first named track means;

d. boat engaging and supporting means disposed adjacent the rear end of said mobile frame and centered on the longitudinal central axis of said frame;

e. a movable boat supporting dolly engaging said first named track means and movable between said boat engaging and supporting means and a forward end of said first named track means; said boat supporting dolly including:

1. a dolly frame movably supported on said first named track means and extending transversely thereof and having spaced opposite ends thereof substantially centered on the longitudinal central axis of said mobile frame;

2. means on said dolly frame for supporting a keel and adjacent bottom surfaces of a boat;

3. an arm pivotally mounted on each of the opposite ends of said dolly frame;
4. means on each of said arms for releaseable positioning said dolly in a storage position adjacent said boat engaging and supporting means;
5. means on said arms and engageable by a bow of a boat to effect release of said dolly from the storage position in response to movement of the boat onto said boat engaging and supporting means;

f. a plurality of boat supporting carriages movable from said storage track means and into and along said first named track means;

g. means connecting said carriages and engageable by said dolly for effecting movement of said carriages from said storage track means into said first named track means and spacing same therealong;

h. means on said mobile frame for limiting movement of a boat thereon; and i. means mounted on said frame for moving a boat from a body of water onto said boat engaging and supporting means and onto said dolly and onto a plurality of said carriages and for moving the boat from the frame and into the water.

7. A boat trailer structure comprising:
a. an elongated mobile frame having a front end and a rear end and a draft tongue coupled to the front end thereof and extending outwardly therefrom and having means thereon for removably coupling said frame to a vehicle;
b. track means disposed along a longitudinal central axis of said mobile frame;
c. storage track means communicating with said first named track means;
d. said storage track means and said first named track means are longitudinally aligned along the longitudinal central axis of said mobile frame;
e. said first named track means comprises a pair of transversely spaced rails;
f. said storage track means comprises a pair of transversely spaced rails positioned between and below said rails of said first named track means;
g. a forward portion of the rails of said storage track means is positioned in a curved path extending upwardly from a lower portion of said storage track means;
h. boat engaging and supporting means disposed adjacent the rear end of said mobile frame and centered on the longitudinal central axis of said frame;
i. a movable boat supporting dolly engaging said first named track means and movable between said boat engaging and supporting means and a forward end of said first named track means;
j. a plurality of boat supporting carriages movable from said storage track means and into and along said first named track means;
k. means connecting said carriages and engageable by said dolly for effecting movement of said carriages from said storage track means into said first named track means and spacing same therealong;
l. means on said mobile frame for limiting movement of a boat thereon; and
m. means mounted on said frame for moving a boat from a body of water onto said boat engaging and supporting means and onto said dolly and onto a plurality of said carriages and for moving the boat from the frame and into the water.

8. A boat trailer structure as set forth in claim 7, wherein:
a. said boat supporting carriages each comprise a carriage frame movably supported on said storage track means and on said first named track means and movable therebetween and means on the carriage frame for supporting a keel and adjacent bottom surfaces of a boat; and
b. said means connecting said carriages and engageable by said dolly comprises a center track having a guide member movable therealong and having an upstanding portion engageable by said dolly and having flexible member portions connected to said upstanding portion and extending between said guide member and one of said carriages and between each of said carriages, said flexible member portions each having a selected length to thereby maintain a selected spacing between said carriages.

9. A boat trailer structure as set forth in claim 8 including:
a. means between adjacent carriages and having respective flexible member portions connected thereto for supporting same and reducing an amount of said flexible member portions depending from said carriages when in said storage track means; and
b. means on said flexible member supporting means for substantially maintaining said carriages aligned with the longitudinal central axis of said mobile frame.

10. A boat trailer structure comprising:
a. an elongated mobile frame having a front end and a rear end and a draft tongue coupled to the front end thereof and extending outwardly therefrom and having means thereon for removably coupling said frame to a vehicle;
b. track means disposed along a longitudinal central axis of said mobile frame;
c. storage track means communicating with said first named track means;
d. boat engaging and supporting means disposed adjacent the rear end of said mobile frame and centered on the longitudinal central axis of said frame;
e. a movable boat supporting dolly engaging said first named track means and movable between said boat engaging and supporting means and a forward end of said first named track means;
f. a plurality of boat supporting carriages movable from said storage track means and into and along said first named track means;
g. means connecting said carriages and engageable by said dolly for effecting movement of said carriages from said storage track means into said first named track means and spacing same therealong;
h. means on said mobile frame for limiting movement of a boat thereon, said boat movement limiting means including:
1. means mounted adjacent the rear end of said mobile frame and having movable portions for engaging a stern of a boat and retaining the boat on the boat trailer structure;

2. means on said boat stern retaining means for selectively moving the movable portions thereof between a stern engaging position and a boat releasing portion to permit unloading the boat from the boat trailer structure;
i. means mounted on said frame for moving a boat from a body of water onto said boat engaging and supporting means and onto said dolly and onto a plurality of said carriages and for moving the boat from the frame and into the water;
j. said boat stern retaining means includes a support member mounted adjacent the rear end of said mobile frame and having a generally vertically extending member and a guide frame mounted thereon;
k. the movable portions of said boat stern retaining means includes a resiliently mounted plunger shaft movable within the guide frame and having a keeper roller rotatably mounted on an upper end thereof and an L-shaped member pivotally mounted adjacent a lower end of said generally vertically extending member and one arm of said L-shaped member pivotally connected to a lower end of said plunger shaft whereby movement of the other arm of said L-shaped member effects movement of said plunger shaft relative to said guide frame; and
l. the resilient mounting of said plunger shaft urges the keeper roller toward an extended position above said guide frame.

* * * * *